United States Patent
Kobayashi et al.

(10) Patent No.: US 9,485,351 B2
(45) Date of Patent: Nov. 1, 2016

(54) MOBILE TERMINAL DEVICE AND CONTROL METHOD FOR MOBILE TERMINAL DEVICE

(71) Applicant: KYOCERA Corporation, Kyoto-shi, Kyoto (JP)

(72) Inventors: Hiroki Kobayashi, Osaka (JP); Atsushi Suzuki, Nishinomiya (JP)

(73) Assignee: KYOCERA Corporation, Kyoto (JP)

( * ) Notice: Subject to any disclaimer, the term of this patent is extended or adjusted under 35 U.S.C. 154(b) by 17 days.

(21) Appl. No.: 14/630,482

(22) Filed: Feb. 24, 2015

(65) Prior Publication Data

US 2015/0172452 A1 Jun. 18, 2015

Related U.S. Application Data

(63) Continuation of application No. PCT/JP2013/072233, filed on Aug. 21, 2013.

(30) Foreign Application Priority Data

Aug. 24, 2012 (JP) ................................. 2012-184748

(51) Int. Cl.
*H04M 3/42* (2006.01)
*H04M 1/725* (2006.01)
*H04M 1/60* (2006.01)

(52) U.S. Cl.
CPC ....... *H04M 1/72583* (2013.01); *H04M 1/6041* (2013.01); *H04M 1/6066* (2013.01); *H04M 1/72563* (2013.01); *H04M 2250/22* (2013.01)

(58) Field of Classification Search
None
See application file for complete search history.

(56) References Cited

U.S. PATENT DOCUMENTS

| 2003/0099367 | A1 | 5/2003 | Okamura |
| 2009/0285383 | A1* | 11/2009 | Tsuei ................. G06F 3/04883 379/242 |
| 2011/0055742 | A1 | 3/2011 | Tomono |

(Continued)

FOREIGN PATENT DOCUMENTS

| JP | H11-168534 A | 6/1999 |
| JP | 2001-352374 A | 12/2001 |

(Continued)

OTHER PUBLICATIONS

International Preliminary Report on Patentability issued by Japanese Patent Office for counterpart International application No. PCT/JP2013/072233.

(Continued)

*Primary Examiner* — Suhail Khan
(74) *Attorney, Agent, or Firm* — Procopio Cory Hargreaves and Savitch LLP

(57) ABSTRACT

A mobile terminal device is provided with a call control module configured to switch an output destination of receiving sound in a phone call, between a first sound output module provided in the mobile terminal device, and a second sound output module wirelessly connected to the mobile terminal device. The call control module sets the output destination to the first sound output module for starting the phone call, when a first touch operation is performed with respect to a first object included in an incoming call screen displayed on a display surface, and sets the output destination to the second sound output module for starting the phone call, when a second touch operation different from the first touch operation is performed with respect to the first object.

11 Claims, 11 Drawing Sheets

(56) References Cited

U.S. PATENT DOCUMENTS

| | | | |
|---|---|---|---|
| 2012/0052920 A1 | 3/2012 | Kobayashi et al. | |
| 2014/0018056 A1* | 1/2014 | Miyake | H04M 1/6075 455/418 |
| 2014/0029478 A1* | 1/2014 | Bhagavatula | H04L 65/1053 370/271 |

FOREIGN PATENT DOCUMENTS

| | | |
|---|---|---|
| JP | 2002-237873 A | 8/2002 |
| JP | 2011-048538 A | 3/2011 |
| JP | 2011-114677 A | 6/2011 |
| JP | 2012-095070 A | 5/2012 |
| JP | 2012-113743 A | 6/2012 |
| JP | 2012-147063 A | 8/2012 |

OTHER PUBLICATIONS

International Search Report dated Oct. 15, 2013, issued for International Application No. PCT/JP2013-072233.
Notification of Reasons for Refusal dated May 31, 2016 issued in counterpart Japanese Application No. 2012-184748.

* cited by examiner

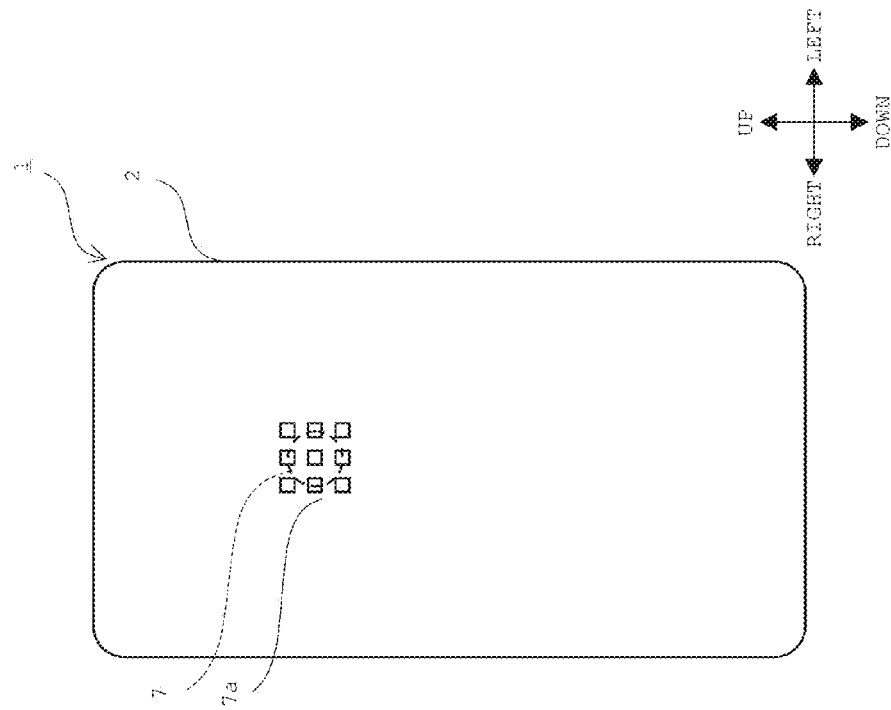
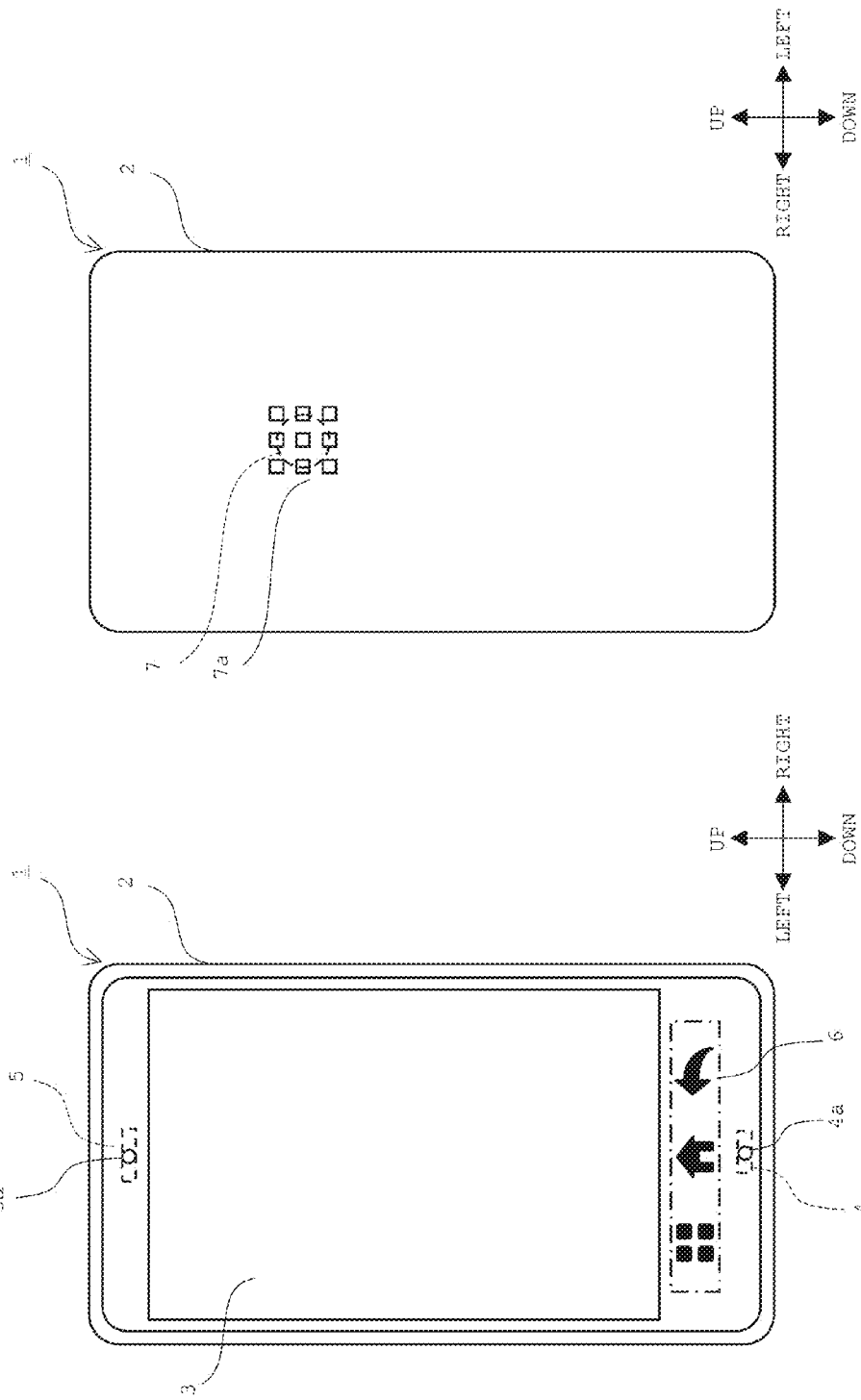

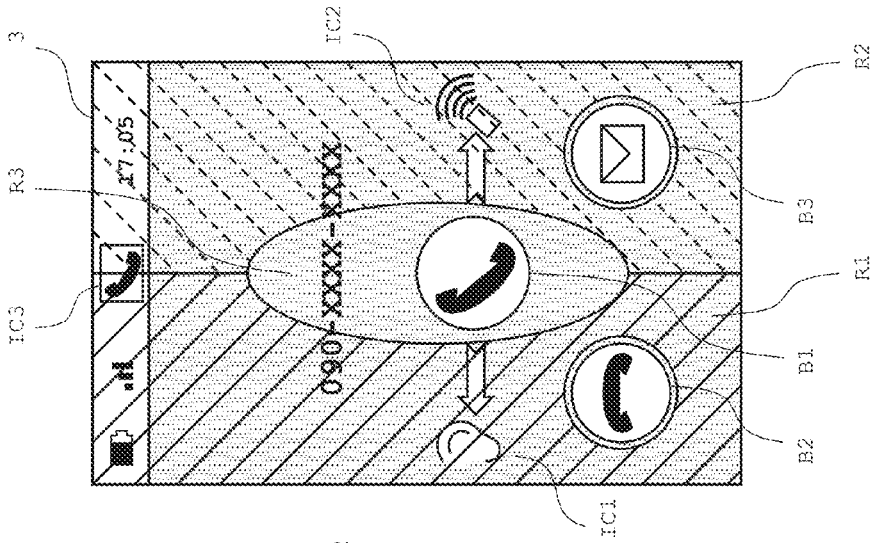
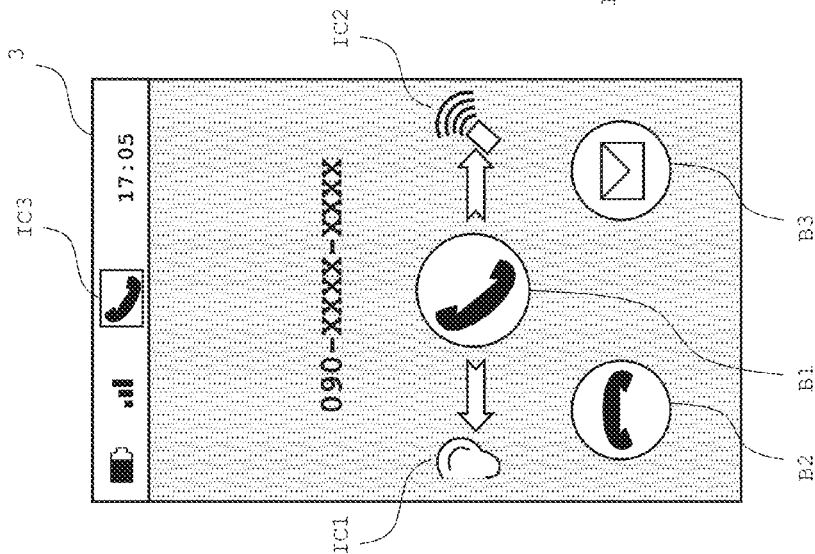
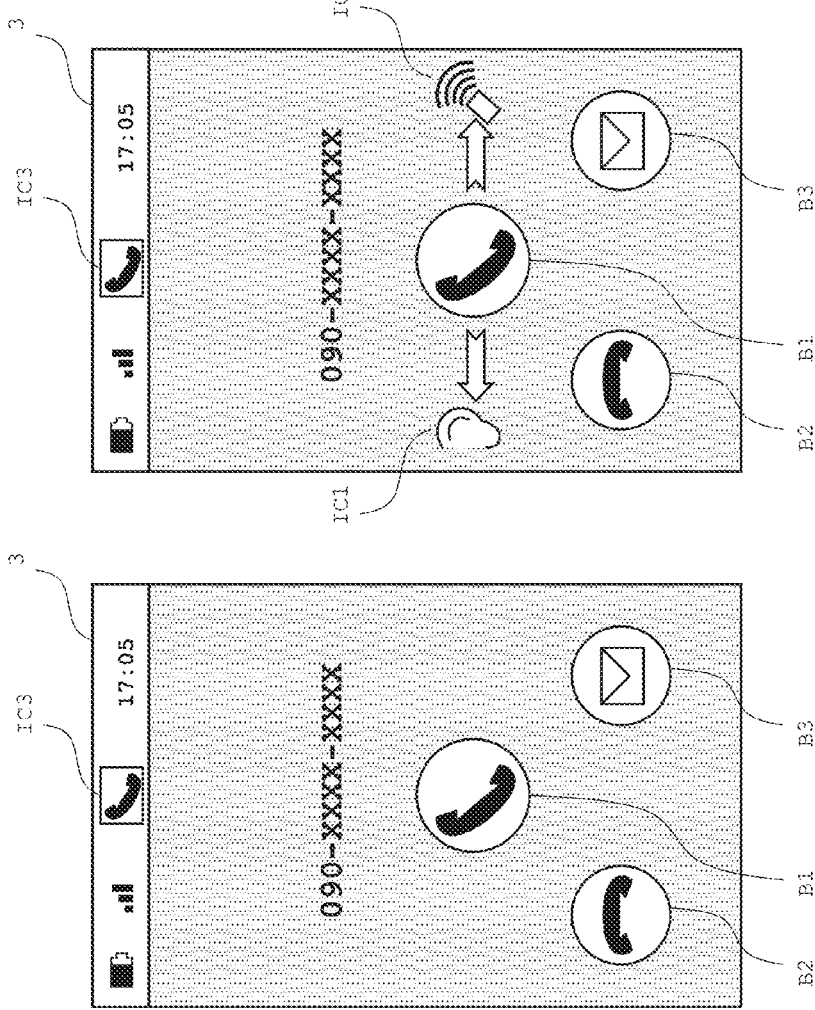

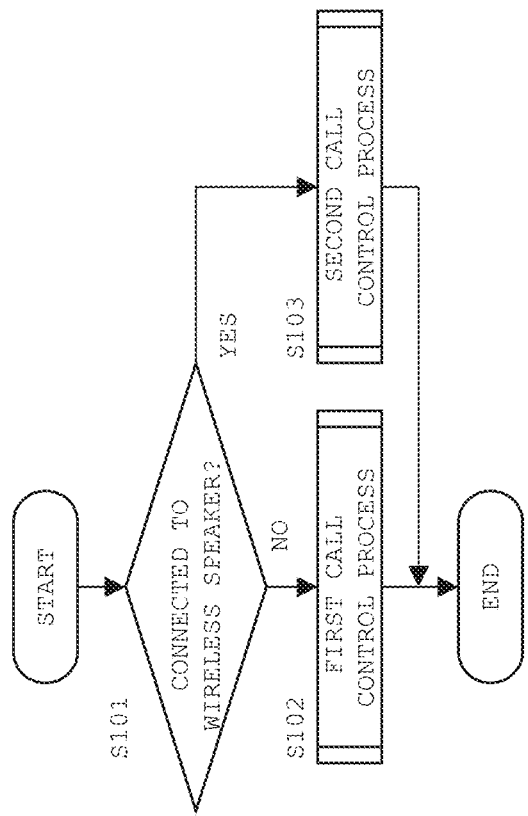

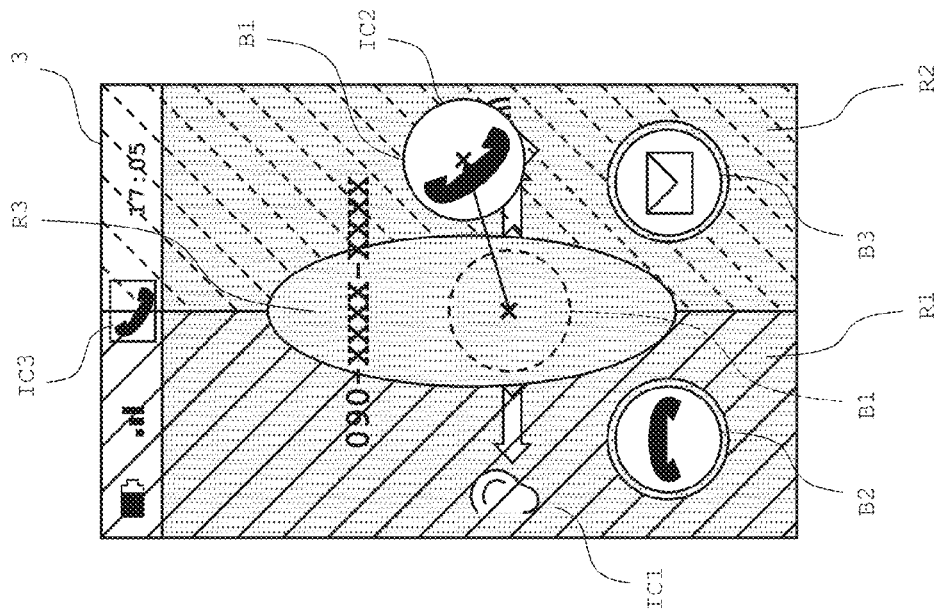
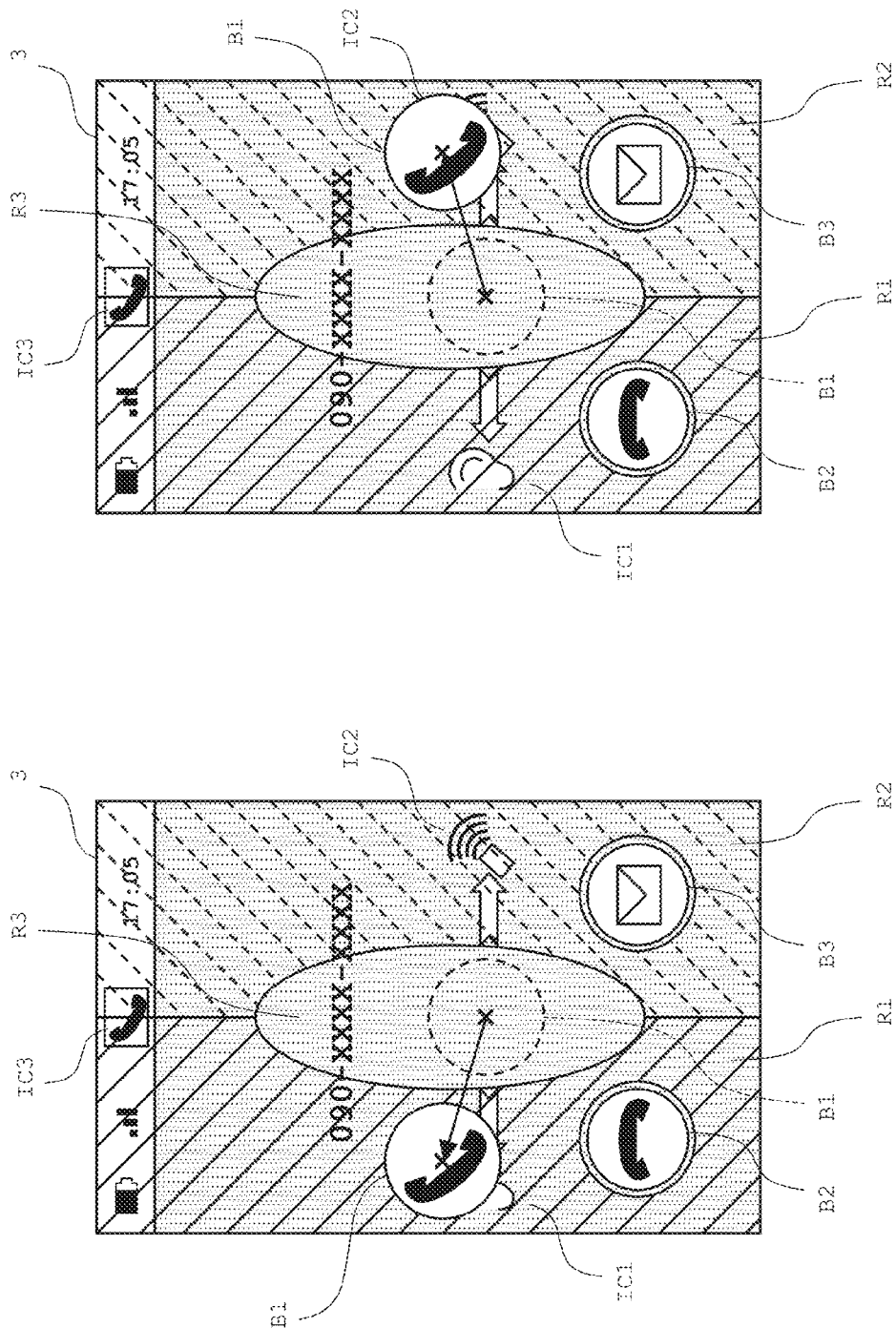

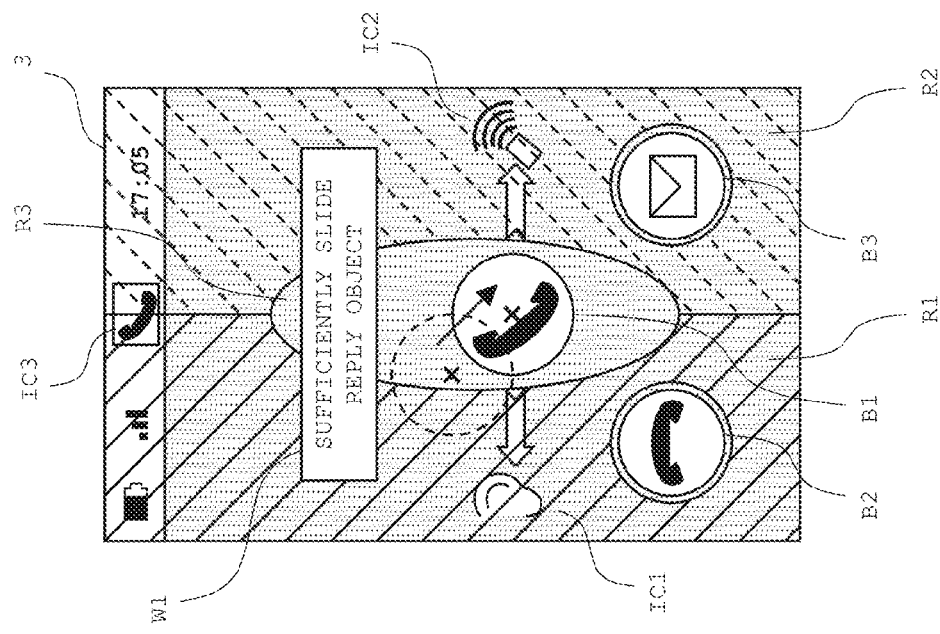
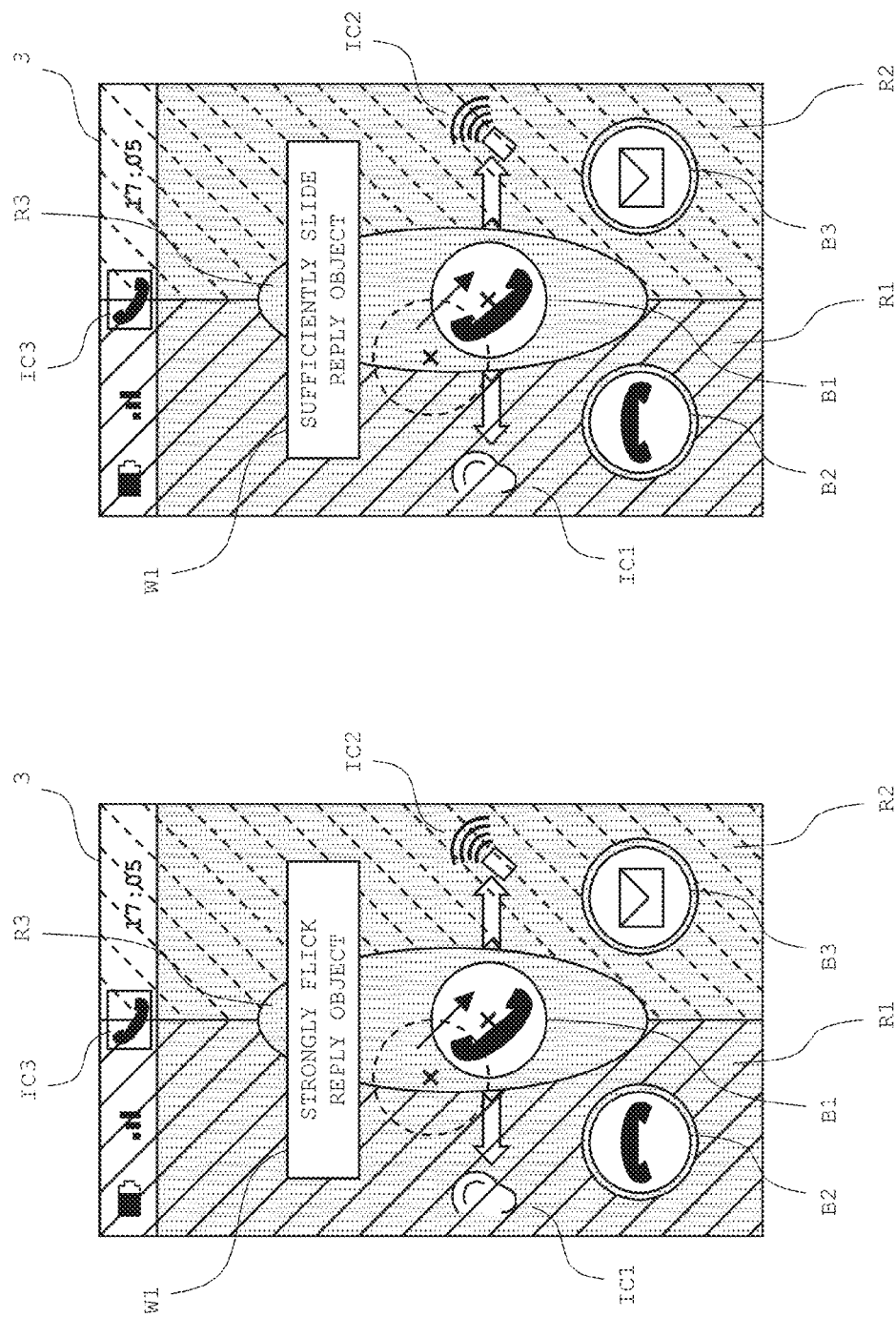

MOBILE TERMINAL DEVICE AND CONTROL METHOD FOR MOBILE TERMINAL DEVICE

The present application is a bypass continuation of international application PCT Application No. PCT/JP2013/072233, filed Aug. 21, 2013, entitled "PORTABLE TERMINAL DEVICE AND METHOD FOR CONTROLLING PORTABLE TERMINAL DEVICE", which claims priority under 35 U.S.C. Section 119 of Japanese Patent Application No. 2012-184748, filed Aug. 24, 2012, entitled "PORTABLE TERMINAL DEVICE, PROGRAM AND METHOD FOR CONTROLLING PORTABLE TERMINAL DEVICE". The disclosure of the above application is incorporated herein by reference.

BACKGROUND

1. Technical Field

Embodiments of the present disclosure relate to a mobile terminal device such as a mobile phone, a PDA (Personal Digital Assistant), a tablet PC, and an electronic book terminal. Embodiments of the present disclosure also relate to a control method suitable for use in the mobile terminal device.

2. Disclosure of Related Art

Conventionally, there is known a mobile phone connectable to a so-called wireless speaker such as a wireless earphone or a wireless headphone. In the mobile phone, when connection setting (pairing) is performed with respect to a wireless speaker, it is possible to automatically switch the output destination of receiving sound to the wireless speaker when an incoming call arrives. During a phone call, receiving sound from the caller is output from the wireless speaker.

SUMMARY

A mobile terminal device according to a first aspect of the disclosure is provided with an incoming call receiving module configured to receive an incoming call; a display module including a display surface; a display control module configured to control the display module; an operation receiving module configured to receive a touch operation with respect to the display surface; and a call control module configured to switch an output destination of receiving sound in a phone call, between a first sound output module provided in the mobile terminal device, and a second sound output module wirelessly connected to the mobile terminal device. In the above configuration, the display control module displays an incoming call screen including a first object on the display surface, when the incoming call receiving module receives an incoming call. Further, the call control module sets the output destination to the first sound output module for starting the phone call, when a first touch operation is performed with respect to the first object, and sets the output destination to the second sound output module for starting the phone call, when a second touch operation different from the first touch operation is performed with respect to the first object.

A second aspect of the disclosure relates to a control method for a mobile terminal device provided with an incoming call receiving module configured to receive an incoming call, a display module including a display surface, and an operation receiving module configured to receive a touch operation with respect to the display surface, the mobile terminal device being configured to set an output destination of receiving sound in a phone call, between a first sound output module provided in the mobile terminal device, and a second sound output module wirelessly connected to the mobile terminal device. The control method according to the second aspect includes displaying an incoming call screen including a first object on the display surface, when the incoming call receiving module receives an incoming call; and setting the output destination to the first sound output module for starting the phone call, when a first touch operation is performed with respect to the first object, and setting the output destination to the second sound output module for starting the phone call, when a second touch operation different from the first touch operation is performed with respect to the first object.

BRIEF DESCRIPTION OF THE DRAWINGS

FIG. 1A and FIG. 1B are illustrations of diagrams illustrating a configuration of a mobile phone according to an embodiment of the disclosure;

FIG. 3A, FIG. 3B, and FIG. 3C are illustrations of diagrams for describing a first incoming call screen and a second incoming call screen to be displayed on a display surface in the embodiment;

FIG. 4 is an illustration of a flowchart illustrating a call control process in the embodiment;

FIG. 8A and FIG. 8B are illustrations of diagrams illustrating a second incoming call screen, when an appropriate flick operation or slide operation is performed with respect to a reply object in the embodiment;

FIGS. 9A and 9B are illustrations of diagrams illustrating a second incoming call screen, when an inappropriate flick operation or slide operation is performed with respect to a reply object in the embodiment;

Figure 2:
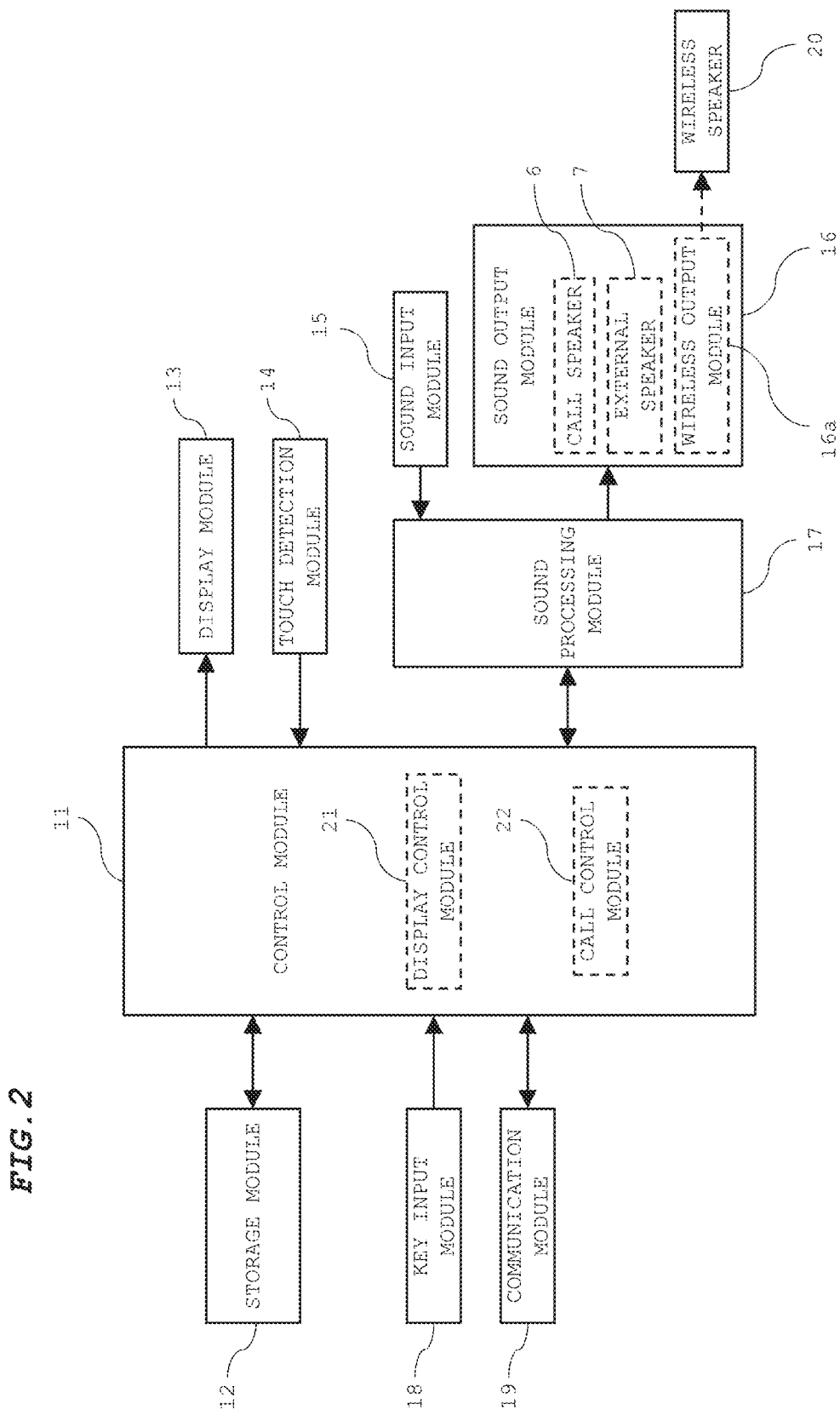
FIG. 2 is an illustration of a block diagram illustrating the entire configuration of the mobile phone in the embodiment.

The drawings are provided mainly for describing the present disclosure, and do not limit the scope of the present disclosure.

DESCRIPTION OF PREFERRED EMBODIMENTS

In the following, an embodiment of the disclosure is described referring to the drawings.

FIG. 1A and FIG. 1B are illustrations of diagrams illustrating a configuration of a mobile phone 1. FIG. 1A and FIG. 1B are respectively a front view and a rear view of the mobile phone 1.

In the following, to simplify the description, as illustrated in FIGS. 1A and 1B, the long side direction of a cabinet 2 is defined as up and down directions, and the short side direction of the cabinet 2 is defined as left and right directions.

The mobile phone 1 may be provided with the cabinet 2, a display surface 3, a microphone 4, a call speaker 5, a key operation part 6, and an external speaker 7.

The cabinet 2 may have a substantially rectangular contour when viewed from the front side. The display surface 3 of a display module 13 to be described later may be disposed on the front surface of the cabinet 2. Various images (screens) are displayed on the display surface 3.

The microphone 4 may be disposed at a lower end within the cabinet 2, and the call speaker 5 may be disposed at an upper end within the cabinet 2. Sound is input into the microphone 4 through a microphone hole 4a formed in the front surface of the cabinet 2. The microphone 4 generates an electrical signal in accordance with input sound. Sound is output from the call speaker 5. Sound output from the call speaker 5 is released to the outside through an output hole 5a formed in the front surface of the cabinet 2.

The key operation part 6 may be disposed on the front surface of the cabinet 2. The key operation part 6 may be constituted of a plurality of operation keys. Various functions for operating a program being executed are assigned to the operation keys.

The external speaker 7 may be disposed in the cabinet 2. Output holes 7a associated with the external speaker 7 are formed in the back surface of the cabinet 2. Sound (voice, alarm, or the like) output from the external speaker 7 is released to the outside through the output holes 7a.

FIG. 2 is an illustration of a block diagram illustrating the entire configuration of the mobile phone 1. The mobile phone 1 may be provided with a control module 11, a storage module 12, the display module 13, a touch detection module 14, a sound input module 15, a sound output module 16, a sound processing module 17, a key input module 18, and a communication module 19.

The storage module 12 may be constituted of an ROM, an RAM, an external memory, and the like. The storage module 12 stores therein various programs. The programs stored in the storage module 12 include, in addition to a control program for controlling the modules of the mobile phone 1, various applications (e.g. applications relating to a phone, an email, a map, a game, and a schedule management). The programs may be stored in the storage module 12 when the mobile phone 1 is manufactured by the manufacturer, or may be stored in the storage module 12 by the user via a communication network or a storage medium.

The storage module 12 also may include a working area in which data to be temporarily used or generated is stored when a program is executed.

The control module 11 may be constituted of a CPU and the like. The control module 11 controls the modules constituting the mobile phone 1 (such as the storage module 12, the display module 13, the touch detection module 14, the sound input module 15, the sound output module 16, the sound processing module 17, the key input module 18, and the communication module 19) in accordance with a program.

The display module 13 may be constituted of a liquid crystal display and the like. The display module 13 displays an image (a screen) on the display surface 3, based on a control signal and an image signal from the control module 11. The display module 13 may be constituted of the display device such as an organic EL display, in place of a liquid crystal display.

The touch detection module 14 may be constituted of a touch panel configured to detect touch of the display surface 3 by the fingertip. The touch panel may be formed of a transparent sheet-like member, and may be disposed on the front surface of the cabinet 2 while covering the display surface 3. The touch panel may be any one of various types of touch panels such as an electrostatic capacitive touch panel, an ultrasonic touch panel, a pressure sensitive touch panel, a resistive touch panel, and a photosensitive touch panel.

The touch detection module 14 receives a user's touch operation with respect to the display surface 3. Specifically, the touch detection module 14 detects a position on the display surface 3 where the fingertip has touched as a touch position, and outputs a position signal in accordance with the detected touch position to the control module 11.

The user is allowed to perform various touch operations by touching the display surface 3 by the fingertip. Examples of the touch operations are a tap operation, a flick operation, and a slide operation. The tap operation is an operation of touching the display surface 3 by the fingertip, and then releasing the fingertip from the display surface 3 within a short time. The flick operation is an operation of flipping the display surface 3 in an arbitrary direction with the fingertip. The slide operation is an operation of moving the fingertip on the display surface 3 in an arbitrary direction while keeping the fingertip in contact with the display surface 3. The flick operation and the slide operation are touch operations accompanying movement of a touch position.

The touch operations are described in detail. For instance, after a touch position with respect to the display surface 3 is detected by the touch detection module 14, when the touch position cannot be detected anymore within a predetermined first time, the control module 11 determines that a tap operation has been performed. After a touch position with respect to the display surface 3 is detected by the touch detection module 14 and the touch position is moved by a predetermined first distance or more within a predetermined second time, when the touch position cannot be detected any more, the control module 11 determines that a flick operation has been performed. After a touch position with respect to the display surface 3 is detected by the touch detection module 14, when the touch position is moved by a predetermined second distance or more, the control module 11 determines that a slide operation has been performed.

The sound input module 15 may be constituted of the microphone 4 and the like. The sound input module 15 outputs an electrical signal from the microphone 4 to the sound processing module 17.

The sound output module 16 may include the call speaker 5 and the external speaker 7. The sound output module 16 receives an electrical signal from the sound processing module 17, and outputs sound (voice, alarm, or the like) from the call speaker 5 or from the external speaker 7.

The sound output module 16 may further include a wireless output module 16a. The wireless output module 16a may have a communication circuit for short-distance wireless communication. The wireless output module 16a converts an electrical signal from the sound processing module 17 into a wireless signal for short-distance wireless communication, and transmits the converted wireless signal to a wireless speaker 20, for instance, to a wireless earphone. According to this configuration, sound is output from the wireless speaker 20. Connection setting (pairing) for enabling bi-directional communication is performed in advance between the wireless speaker 20 and the mobile phone 1.

The sound processing module 17 performs e.g. A/D conversion to an electrical signal from the sound input module 15, and outputs a digital sound signal which has undergone A/D conversion to the control module 11. The sound processing module 17 performs e.g. a decoding process and D/A conversion to the digital sound signal output from the control module 11, and outputs an electrical signal which has undergone D/A conversion to the sound output module 16.

The key input module 18 outputs, to the control module 11, a signal associated with each one of the operation keys when the operation keys in the key operation part 6 are pressed.

The communication module 19 may be provided with a circuit for converting a signal, and an antenna for transmitting and receiving a radio wave in order to make a phone call or to perform communication. The communication module 19 converts a signal to be input from the control module 11 for a phone call or for communication into a wireless signal, and transmits the converted wireless signal to a communication destination such as a base station or another communication device via the antenna. Further, the communication module 19 converts the wireless signal received via the antenna into a signal of a format usable by the control module 11, and outputs the converted signal to the control module 11.

The control module 11 may include a display control module 21 and a call control module 22.

The display control module 21 controls the display module 13. The display control module 21 displays an incoming call screen on the display surface 3, when an incoming call arrives at the communication module 19. When connection setting to the wireless speaker 20 is not established at the time of arrival of an incoming call, the display control module 21 displays a first incoming call screen; and when connection setting to the wireless speaker 20 is established at the time of arrival of an incoming call, the display control module 21 displays a second incoming call screen.

FIG. 3A and FIG. 3B are illustrations of diagrams respectively illustrating the first incoming call screen and the second incoming call screen to be displayed on the display surface 3. As illustrated in FIG. 3A, the first incoming call screen includes a reply object B1, a first stop object B2, and a second stop object B3. The reply object B1 is an object to be operated in order to answer an incoming call, and is disposed near the center of the first incoming call screen. The first stop object B2 and the second stop object B3 are objects to be operated in order to disconnect the incoming call, without answering the incoming call, and are disposed on the left and right sides on the first incoming call screen at a position lower than the reply object B1. Further, the phone number of the caller is displayed on the first incoming call screen, and an icon IC3 indicating that a call is coming is displayed in a pictographic display region of the display surface 3.

As illustrated in FIG. 3B, the second incoming call screen includes a first guide icon IC1 and a second guide icon IC2, in addition to the reply object B1, the first stop object B2, and the second stop object B3. The first guide icon IC1 is disposed on the left side on the second incoming call screen substantially at the same height as the reply object B1. The first guide icon IC1 guides the direction of a touch operation (a flick operation or a slide operation) when the reply object B1 is moved for setting the output destination of receiving sound to the call speaker 5. The second guide icon IC2 is disposed on the right side on the second incoming call screen substantially at the same height as the reply object B1. The second guide icon IC2 guides the direction of a touch operation when the reply object B1 is moved for setting the output destination of receiving sound to the wireless speaker 20. Further, as well as the first incoming call screen, the phone number of the caller is displayed on the second incoming call screen, and an icon IC3 indicating that a call is coming is displayed in a pictographic display region of the display surface 3.

The call control module 22 sets a first switching region R1 associated with the call speaker 5, and a second switching region R2 associated with the wireless speaker 20 on the second incoming call screen.

FIG. 3C is an illustration of a diagram depicting the first switching region R1 and the second switching region R2 on the second incoming call screen. On the actual second incoming call screen, the first switching region R1 and the second switching region R2 are not depicted.

As illustrated in FIG. 3C, the first switching region R1 (indicated by the solid oblique lines) is set on the half left portion of the second incoming call screen, and the second switching region R2 (indicated by the broken oblique lines) is set on the half right portion of the second incoming call screen in a state that the reply object B1 is disposed between the first and second switching regions R1 and R2. The entire periphery of the reply object B1 is surrounded by the first switching region R1 and the second switching region R2.

The call control module 22 sets an invalid region R3 around the reply object B1 on the second incoming call screen. The invalid region R3 has an elliptical shape extending in up and down directions of the display surface 3. Unless the reply object B1 is moved beyond the invalid region R3 by a flick operation or a slide operation, the reply object B1 does not reach the first switching region R1 or the second switching region R2. The shape of the invalid region R3 is not limited to an elliptical shape, but may be any other shape such as a perfect circular shape.

The first stop object B2 is disposed in the first switching region R1. The first switching region R1 is set in such a manner that the region where the first stop object B2 is displayed is eliminated. The second stop object B3 is disposed in the second switching region R2. The second switching region R2 is set in such a manner that the region where the second stop object B3 is displayed is eliminated.

The first guide icon IC1 is located in the first switching region R1, and the second guide icon IC2 is located in the second switching region R2.

When a flick operation is performed with respect to the reply object B1, the call control module 22 determines the position of the destination of the reply object B1, based on the direction and the speed of the flick operation. The storage module 12 stores therein a lookup table representing a relationship between the speed of a flick operation (a value corresponding to a speed, e.g., a distance by which the touch position is moved within the second time), and the moving distance of the reply object B1. The call control module 22 obtains a moving distance associated with the speed of a flick operation, referring to the lookup table, and determines the position of the destination of the reply object B1 from the obtained moving distance and the direction of the flick operation. The storage module may store therein an arithmetic expression for computing a moving distance of the reply object B1 from the speed of a flick operation, in place of using a lookup table.

When a flick operation with respect to the reply object B1 is performed in such a manner that the position of the destination of the reply object B1 is in the first switching region R1, the call control module 22 sets the output destination of receiving sound to the call speaker 5 for starting a phone call. On the other hand, when a flick operation with respect to the reply object B1 is performed in such a manner that the position of the destination of the reply object B1 is in the second switching region R2, the call control module 22 sets the output destination of receiving sound to the wireless speaker 20 for starting a phone call.

Further, when a slide operation with respect to the reply object B1 is performed in such a manner that the release position of the reply object B1 is in the first switching region R1, the call control module 22 sets the output destination of receiving sound to the call speaker 5 for starting a phone call. On the other hand, when a slide operation with respect to the reply object B1 is performed in such a manner that the release position of the reply object B1 is in the second switching region R2, the call control module 22 sets the output destination of receiving sound to the wireless speaker 20 for starting a phone call.

When an incoming call arrives at the communication module 19, the control module 11 (the display control module 21 and the call control module 22) executes a call control process.

Figure 5:
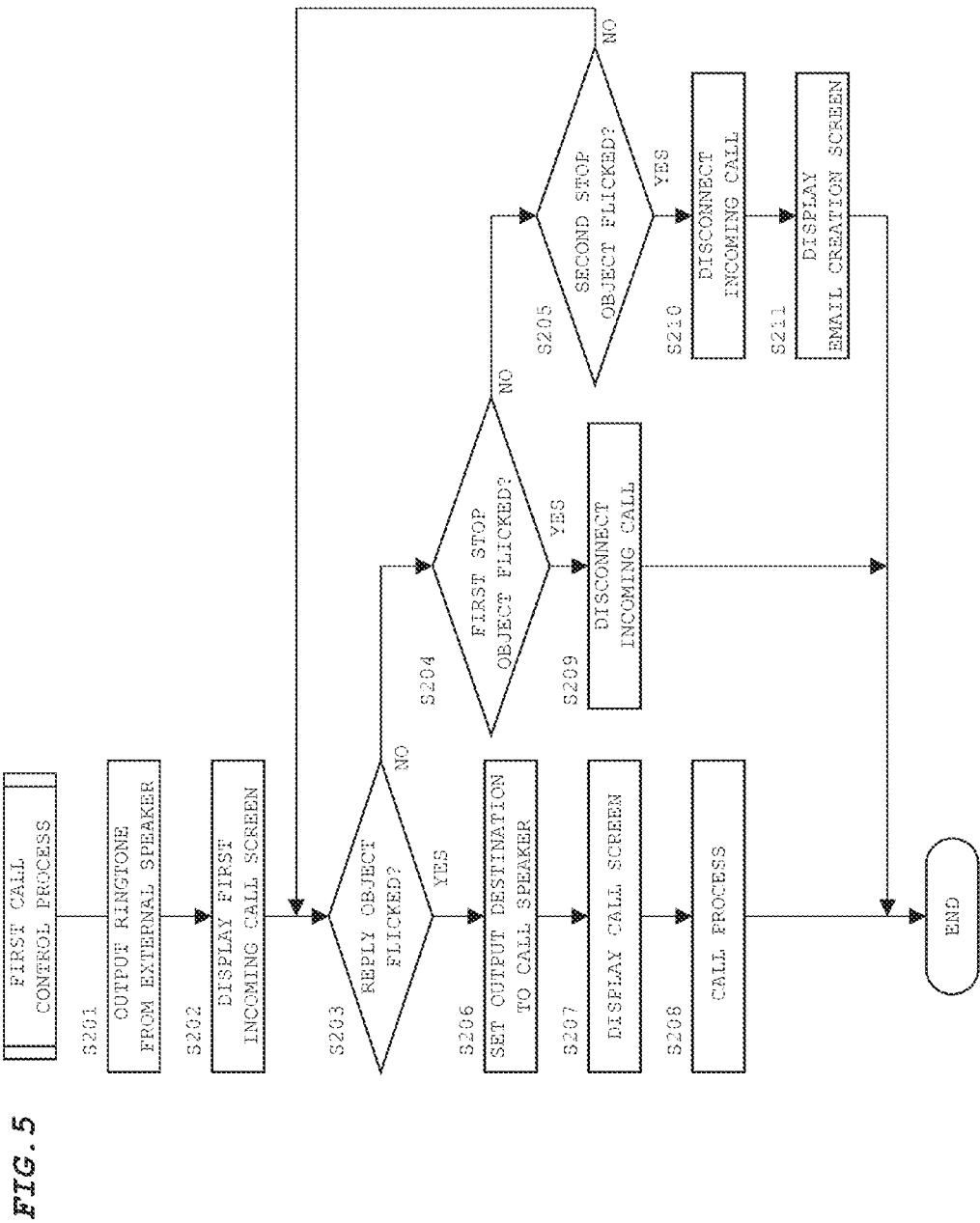
FIG. 5 is an illustration of a flowchart illustrating a first call control process included in the call control process in the embodiment.
Figure 6:
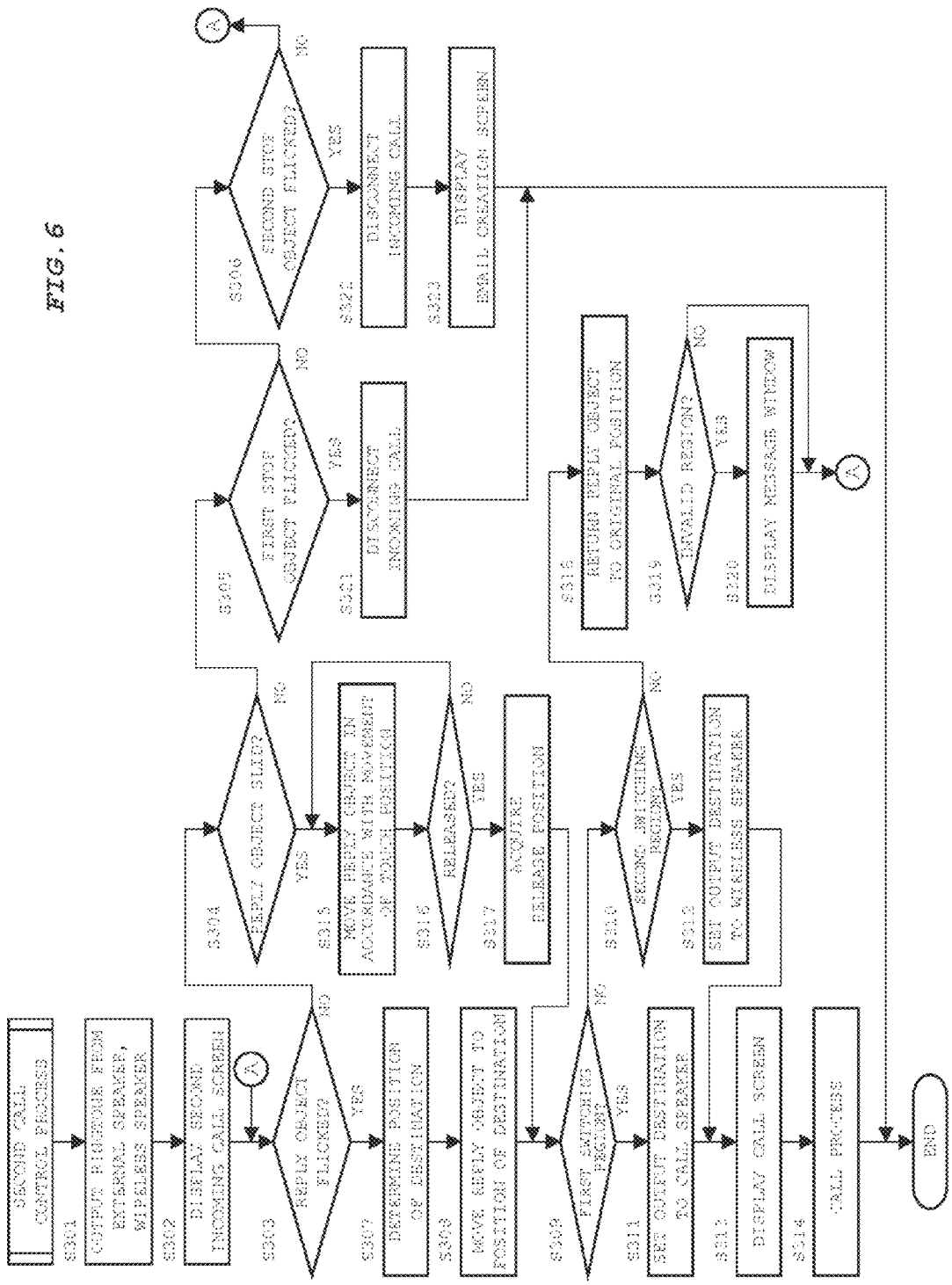
FIG. 6 is an illustration of a flowchart illustrating a second call control process included in the call control process in the embodiment.

FIG. 4 is an illustration of a flowchart illustrating a call control process. FIG. 5 is an illustration of a flowchart illustrating a first call control process included in the call control process. FIG. 6 is an illustration of a flowchart illustrating a second call control process included in the call control process.

When the communication module 19 receives an incoming call from a caller's phone, the control module determines whether the wireless speaker 20 is connected to the mobile phone 1 (S101). When the wireless speaker 20 is not connected to the mobile phone 1 (S101: NO), the control module 11 executes a first call control process (S102). In the following, the first call control process is described referring to FIG. 5.

The display control module 21 outputs a ringtone from the external speaker 7 (S201), and displays the first incoming call screen illustrated in FIG. 3A on the display surface 3 (S202). The call control module determines whether a flick operation has been performed with respect to the reply object B1 (S203). Further, the call control module 22 determines whether a flick operation has been performed with respect to the first stop object B2, and determines whether a flick operation has been performed with respect to the second stop object B3 (S204 and S205).

When the user answers an incoming call, the user performs a flick operation with respect to the reply object B1. When it is determined that a flick operation has been performed with respect to the reply object B1 (S203: YES), the call control module 22 sets the output destination of receiving sound to the call speaker 5 (S206).

Then, the display control module 21 displays a call screen on the display surface 3 (S207). The call control module 22 stops the ringtone, and starts a call process (S208). When a communication network with the caller's phone is established, and sound data is received from the caller's phone via the communication module 19, the receiving sound is output from the call speaker 5. Further, when user's voice is input to the microphone 4, the call control module 22 transmits the sound data to the caller's phone via the communication module 19.

Figure 7:
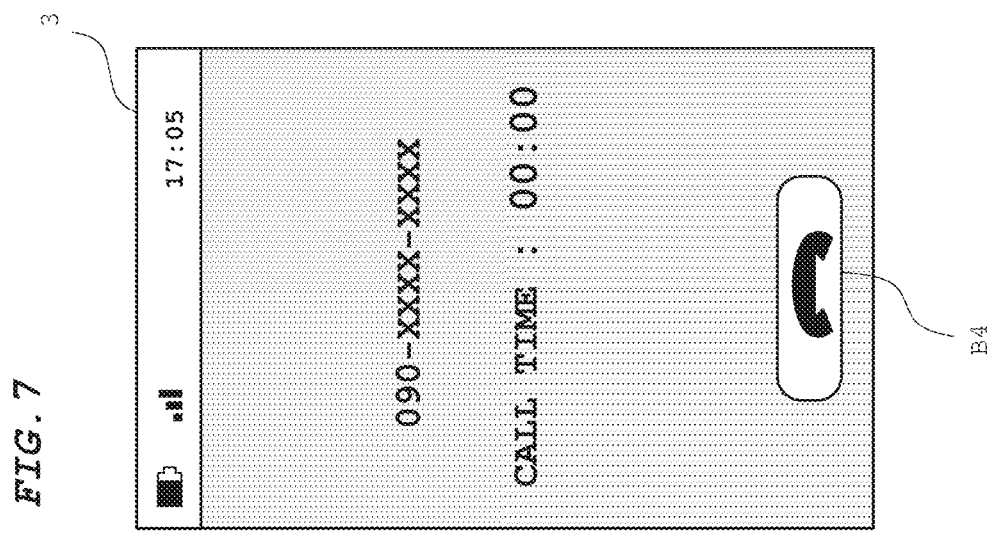
FIG. 7 is an illustration of a diagram illustrating a call screen to be displayed on the display surface in the embodiment.

FIG. 7 is an illustration of a diagram illustrating a call screen to be displayed on the display surface 3. As illustrated in FIG. 7, information relating to a call, for instance, the phone number of the caller and a call time are displayed on the call screen. Further, a call end object B4 is disposed on the call screen.

When a touch operation, for instance, a tap operation or a flick operation is performed with respect to the call end object B4, the call control module 22 finishes the call process. Then, the call control process is finished, and a screen that was displayed before the incoming call has arrived is displayed on the display surface 3.

When the user cannot answer the phone, the user performs a flick operation with respect to the first stop object B2 or the second stop object B3.

When it is determined that a flick operation has been performed with respect to the first stop object B2 (S204: YES), the call control module 22 disconnects the incoming call, and stops the ringtone output from the external speaker 7 (S209). On the other hand, it is determined that a flick operation has been performed with respect to the second stop object B3 (S205: YES), the call control module 22 disconnects the incoming call, and stops the ringtone (S210). Then, the call control module 22 displays an email creation screen on the display surface 3 (S211). Thereafter, an email including information input by the user is transmitted to the caller's phone via the communication module 19 by a user's transmission operation.

When connection setting to the wireless speaker 20 is performed during display of the first incoming call screen, the control module 11 finishes the first call control process, and starts the second call control process.

Referring back to FIG. 3, in Step S101, when it is determined that the wireless speaker 20 is connected to the mobile phone 1 (S101: YES), the control module 11 executes the second call control process (S102). In the following, the second call control process is described referring to FIG. 6.

The display control module 21 outputs a ringtone from the external speaker 7 and from the wireless speaker 20 (S301), and displays the second incoming call screen illustrated in FIG. 3B on the display surface 3 (S302). The call control module 22 determines whether a flick operation has been performed with respect to the reply object B1 (S303). Then, the call control module 22 determines whether a slide operation has been performed with respect to the reply object B1 (S304). Then, the call control module 22 determines whether a flick operation has been performed with respect to the first stop object B2, and determines whether a flick operation has been performed with respect to the second stop object B3 (S305 and S306).

When the user answers an incoming call, the user performs a flick operation with respect to the reply object B1. Specifically, when the user selects the call speaker 5 as the output destination of receiving sound, the user flicks the reply object B1 in a direction toward the first switching region R1, namely, in a direction toward the first guide icon IC1. On the other hand, when the user selects the wireless speaker 20 as the output destination of receiving sound, the user flicks the reply object B1 in a direction toward the second switching region R2, namely, in a direction toward the second guide icon 1C2.

When it is determined that a flick operation has been performed with respect to the reply object B1 (S303: YES), as described above, the call control module 22 refers to the lookup table, and obtains a moving distance of the reply object B1 (the center of the object) from the speed of the flick operation. Subsequently, the call control module 22 determines the position of the destination of the reply object B1, based on the obtained moving distance and the direction of the flick operation (S307). The direction of a flick operation is obtained by the first-time touch position and the release position in the flick operation. The display control module 21 moves the reply object B1 to the position of the destination on the second incoming call screen (S308).

The call control module 22 determines whether the position of the destination of the reply object B1 is in the first switching region R1, and determines whether the position of the destination of the reply object B1 is in the second switching region R2 (S309 and S310).

When a flick operation with respect to the reply object B1 has been performed by the user in a direction toward the first guide icon IC1 at a sufficient speed, as illustrated in FIG. 8A, the reply object B1 is moved to the first switching region R1. In this case, the call control module 22 determines that the position of the destination of the reply object B1 is in the first switching region R1 (S309: YES), and sets the output destination of receiving sound to the call speaker 5 (S311).

On the other hand, when a flick operation with respect to the reply object B1 has been performed by the user in a direction toward the second guide icon IC2 at a sufficient speed, as illustrated in FIG. 8B, the reply object B1 is moved to the second switching region R2. In this case, the call control module 22 determines that the position of the destination of the reply object B1 is in the second switching region R2 (S309: NO and S310: YES), and sets the output destination of receiving sound to the wireless speaker 20 (S312).

The display control module 21 displays a call screen on the display surface 3 (S313). The call control module 22 stops the ringtone, and starts a call process (S314). During a phone call, when the output destination is set to the call speaker 5, receiving sound is output from the call speaker 5, and when the output destination is set to the wireless speaker 20, receiving sound is output from the wireless speaker 20.

The user is also allowed to answer an incoming call by performing a slide operation with respect to the reply object B1. In this case, when the user selects the call speaker 5 as the output destination of receiving sound, the user slides the reply object B1 in a direction toward the first guide icon IC1. On the other hand, when the user selects the wireless speaker 20 as the output destination of receiving sound, the user slides the reply object B1 in a direction toward the second guide icon IC2.

When it is determined that a slide operation has been performed with respect to the reply object B1 (S304: YES), the display control module 21 moves the reply object B1 in accordance with a movement of the touch position on the second incoming call screen (S315). The call control module 22 determines whether the fingertip has been released from the reply object B1, namely, from the display surface 3 (S316). When it is determined that the fingertip has been released (S316: YES), the call control module 22 acquires a release position (S317).

The call control module 22 determines whether the release position is in the first switching region R1, and determines whether the release position is in the second switching region R2 (S309 and S310).

As illustrated in FIG. 8A, when the fingertip is released after the reply object B1 has been moved to the first switching region R1, the call control module 22 determines that the release position is in the first switching region R1 (S309: YES), and sets the output destination of receiving sound to the call speaker 5 (S311).

On the other hand, as illustrated in FIG. 8B, when the fingertip is released after the reply object B1 has been moved to the second switching region R2, the call control module 22 determines that the release position is in the second switching region R2 (S309: NO and S310: YES), and sets the output destination of receiving sound to the wireless speaker 20 (S312).

When the user has failed to perform a flick operation with respect to the reply object B1 at a sufficient speed, the position of the destination may be in the invalid region R3. Further, the position of the destination may be in the region of the first stop object B2 or may be in the region of the second stop object B3 depending on the direction and the speed of a flick operation. Furthermore, when the fingertip is released from the display surface 3 in a state that a slide operation with respect to the reply object B1 has not been sufficiently performed, the release position may be in the invalid region R3. Furthermore, the user may inadvertently move the reply object B1 to the region of the first stop object B2 or to the region of the second stop object B3, and may release the fingertip in the region. In such a case, the call control module 22 does not set the output destination, and the control does not proceed to a call process, based on a determination that the position of the destination (the release position) is not in the first switching region R1 and in the second switching region R2 (S309: NO and S310: NO). Then, the display control module 21 returns the reply object B1 to the original position (S318). Subsequently, when the position of the destination of the reply object B1 after a flick operation has been performed is in the invalid region R3 (S319: YES), as illustrated in FIG. 9A, the display control module 21 returns the reply object B1 to the original position, and then, displays, on the second incoming call screen, a message window W1 constituted of a text prompting the user to perform an appropriate flick operation such as "STRONGLY FLICK REPLY OBJECT" (S320). When the release position of the reply object B1 after a slide operation has been performed is in the invalid region R3 (S319: YES), as illustrated in FIG. 9B, the display control module 21 returns the reply object B1 to the original position, and then, displays, on the second incoming call screen, a message window W1 constituted of a text prompting the user to perform an appropriate slide operation such as "SUFFICIENTLY SLIDE REPLY OBJECT" (S320).

When the user cannot answer the phone, the user flicks the first stop object B2 or the second stop object B3 on the second incoming call screen.

When it is determined that a flick operation has been performed with respect to the first stop object B2 (S305: YES), the call control module 22 disconnects the incoming call, and stops the ringtone output from the external speaker 7 and from the wireless speaker 20 (S321). On the other hand, when it is determined that a flick operation has been performed with respect to the second stop object B3 (S306: YES), the call control module 22 disconnects the incoming call, and stops the ringtone (S322). Then, the call control module 22 displays an email creation screen on the display surface 3 (S323).

As described above, according to the embodiment, when an incoming call arrives in a state that the wireless speaker 20 is connected to the mobile phone 1, the user is allowed to answer the incoming call by operating the reply object B1, and at the same time, select the output destination of receiving sound between the call speaker 5 and the wireless speaker 20. Therefore, the user does not have to perform an operation of switching the output destination after the call is started. This allows for the user to smoothly talk on the phone.

Further, according to the embodiment, simply touching the reply object B1 does not allow the user to select the output destination. Therefore, it is possible to prevent the user from inadvertently select the output destination by a user's unintentional operation. The user's unintentional operation is, for instance, an operation that is executed against the user's will due to contact of the display surface 3 of the mobile phone 1 with an object in a bag, when the mobile phone 1 is put in the bag.

Furthermore, according to the embodiment, the first switching region R1 and the second switching region R2 are set in such a manner as to surround the entire periphery of the reply object B1, and the moving direction of the reply object B1 toward the first switching region R1 or toward the second switching region R2 is not limited to one direction. Therefore, the user can easily select the output destination of receiving sound, regardless of whether the user who operates the mobile phone 1 is a right-handed person or a left-handed person.

In addition, according to the embodiment, the invalid region R3 is set around the reply object B1. Therefore, the output destination is not selected by a flick operation or a slide operation such that the reply object B1 is attempted to be slightly moved. Thus, the above configuration is advantageous in preventing the user from inadvertently select the output destination by a user's unintentional operation.

In addition, according to the embodiment, the first switching region R1 and the second switching region R2 are respectively set in such a manner as to avoid the region of the first stop object B2 and the region of the second stop object B3. Therefore, for instance, when the reply object B1 is moved to the region of the first stop object B2, and the fingertip is released in the region of the first stop object B2, the output destination is not set, and the control does not proceed to a call process. Thus, the above configuration prevents the user from misunderstanding that the control has proceeded to a call process by operating the first stop object B2.

First Modification

Figure 10:
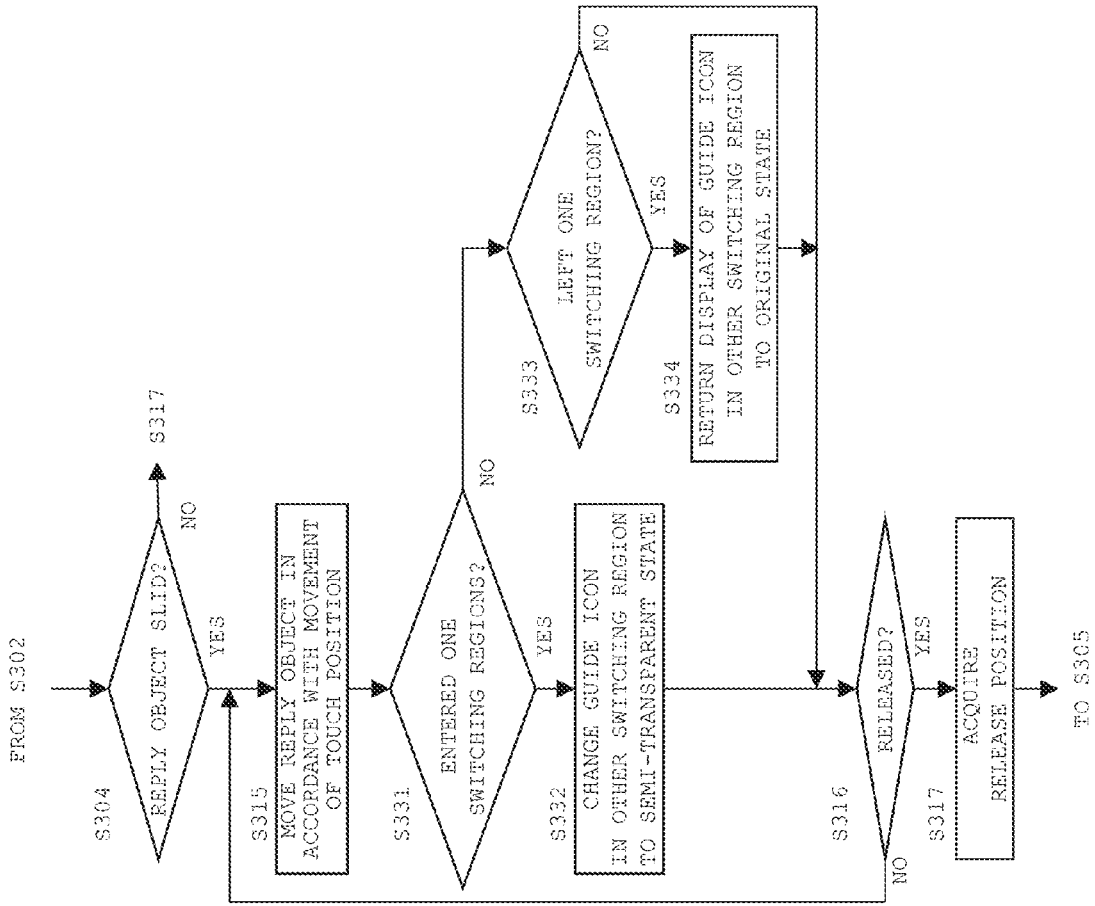
FIG. 10 is an illustration of a flowchart illustrating a second call control process in a first modification.

FIG. 10 is an illustration of a flowchart illustrating a second call control process as the first modification. In FIG. 10, only a part of the process including steps (S331 to S334), which are added to the second call control process (see FIG. 6) in the embodiment, is described.

In the following, the second call control process as the first modification is described. The same steps as those in the embodiment are indicated with the same step numbers, and description thereof is omitted.

When the reply object B1 is moved in accordance with a movement of the touch position on the second incoming call screen (S315), the display control module 21 determines whether the touch position, namely, the reply object B1 (the center of the object) has entered one of the first switching region R1 and the second switching region R2 (S331). When it is determined that the reply object B1 has entered the one switching region (S331: YES), the display control module 21 changes the guide icon IC1 (or IC2) in the other switching region from an opaque state to a semi-transparent state (S332). Further, when the reply object B1 leaves the one switching region in a state that the reply object B1 is touched by the fingertip (S333: YES), the display control module 21 returns the guide icon IC1 (or IC2) in the other switching region in a semi-transparent state to the original opaque state (S334).

According to the configuration of the first modification, the user can accurately recognize which one of the call speaker 5 and the wireless speaker 20 is selected as the output destination of receiving sound by operating the reply object B1.

Alternatively, the guide icon in the other switching region may be changed to a transparent state, in place of a semi-transparent state. Further alternatively, the guide icon may be changed to reduce the size thereof. In other words, the display manner of a guide icon in the region opposite to the region where the reply object B1 is moved may be changed to such a state that the user can easily recognize that the output destination of the guide icon is not selected.

Second Modification

Figure 11:
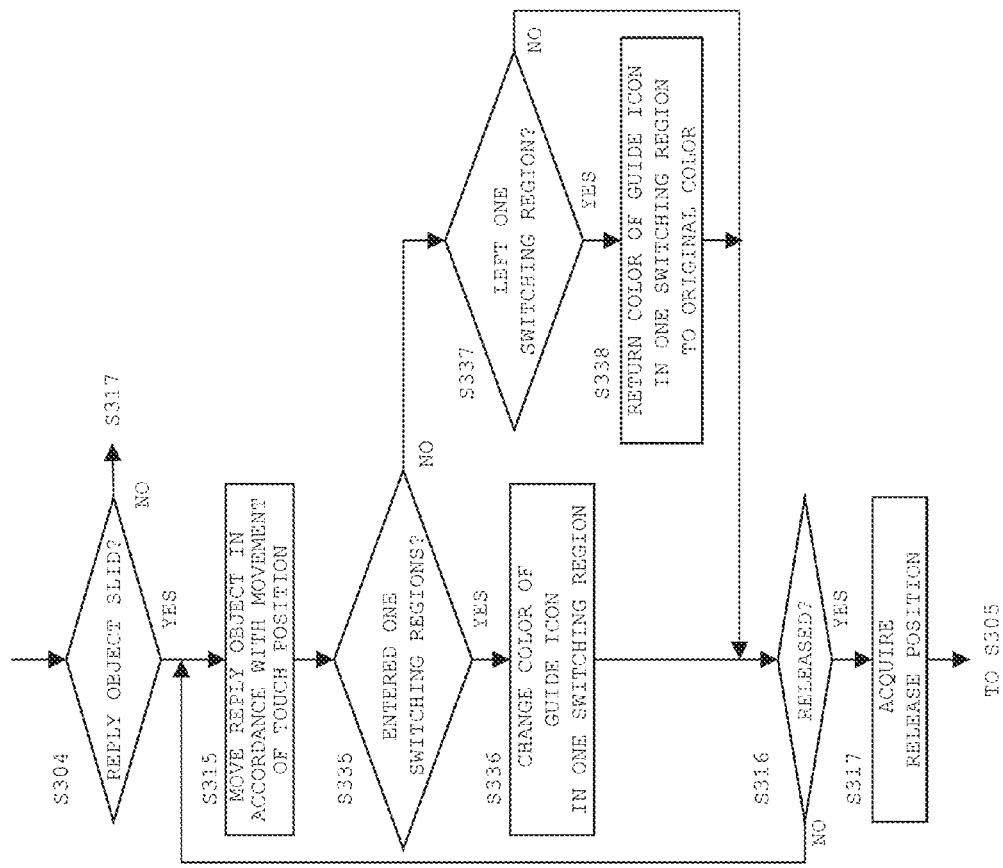
FIG. 11 is an illustration of a flowchart illustrating a second call control process in a second modification.

FIG. 11 is an illustration of a flowchart illustrating a second call control process as the second modification. In FIG. 11, only a part of the process including steps (S335 to S338), which are added to the second call control process (see FIG. 6) in the embodiment, is described.

In the following, the second call control process as the second modification is described. The same steps as those in the embodiment are indicated with the same step numbers, and description thereof is omitted.

When the reply object B1 is moved in accordance with a movement of the touch position on the second incoming call screen (S315), the display control module 21 determines whether the touch position, namely, the reply object B1 (the center of the object) has entered one of the first switching region R1 and the second switching region R2 (S335). When it is determined that the reply object B1 has entered the one switching region (S335: YES), the display control module 21 changes the color of the guide icon IC1 (or IC2) in the one switching region to another color (S336). Subsequently, when the reply object B1 leaves the one switching region in a state that the reply object B1 is touched by the fingertip (S337: YES), the display control module 21 returns the color of the guide icon IC1 (or IC2) in the one switching region to the original color (S338).

According to the configuration of the second modification, the user can accurately recognize which one of the call speaker 5 and the wireless speaker 20 is selected as the output destination of receiving sound by operating the reply object B1.

Alternatively, the shape of a guide icon in a switching region where the reply object B1 has entered may be changed, in place of changing the color of the guide icon. Further alternatively, the guide icon may be changed to increase the size thereof. In other words, the display manner of a guide icon in a region where the reply object B1 is moved may be changed to such a state that the user can easily recognize that the output destination of the guide icon is selected.

Others

The embodiment and the modifications of the present disclosure have been described as above. The present disclosure, however, is not limited to the foregoing embodiment and the modifications, and the embodiment of the present disclosure may be modified in various ways other than the above.

For instance, in the embodiment, the first switching region R1 associated with the call speaker 5, and the second switching region R2 associated with the wireless speaker 20 are set on the second incoming call screen. In place of setting the switching regions as described above, for instance, the lower limit of the speed of a flick operation and the angle range of a direction of a flick operation may be set in association with each of the call speaker 5 and the wireless speaker 20. In this case, when a flick operation whose speed is equal to or larger than the lower limit, and whose direction lies in the angle range associated with the call speaker 5 is performed with respect to the reply object B1, the call speaker 5 is set as the output destination of receiving sound. On the other hand, when a flick operation whose speed is equal to or larger than the lower limit, and whose direction lies in the angle range associated with the wireless speaker 20 is performed with respect to the reply object B1, the wireless speaker 20 is set as the output destination of receiving sound. Further alternatively, the lower limit of the sliding length of a slide operation, and the angle range of the direction of a slide operation may be set in association with each of the call speaker 5 and the wireless speaker 20. In this case, when a slide operation whose sliding length is equal to or longer than the lower limit, and whose direction lies in the angle range associated with the call speaker 5 is performed with respect to the reply object B1, the call speaker 5 is set as the output destination of receiving sound. On the other hand, when a slide operation whose sliding length is equal to or longer than the lower limit, and whose direction lies in the angle range associated with the wireless speaker 20 is performed with respect to the reply object B1, the wireless speaker 20 is set as the output destination of receiving sound.

Further, in the embodiment, the first stop object B2 and the second stop object B3 are provided on the first incoming call screen and on the second incoming call screen, in addition to the reply object B1. Alternatively, one of the first stop object B2 and the second stop object B3 may be omitted, or both of the first stop object B2 and the second stop object B3 may be omitted.

Furthermore, in the embodiment, as illustrated in FIG. 3A and FIG. 3B, the phone number is displayed on the first incoming call screen and on the second incoming call screen. Alternatively, when the phone number of an incoming call is registered in the address book of the mobile phone, the name registered in association with the phone number of the incoming call may be displayed on the display surface 3, in place of the phone number. Further alternatively, both of the phone number and the name associated with the phone number may be displayed on the display surface 3.

The disclosure is not limited to a mobile phone, but may be applied to various kinds of mobile terminal devices such as a PDA (Personal Digital Assistant), a tablet PC, and an electronic book terminal.

The embodiment of the disclosure may be changed or modified in various ways as necessary within the technical scope of the claims of the present disclosure hereinafter defined.

What is claimed is:

1. A mobile terminal device, comprising:
   a display including a display surface; and
   at least one processor configured to
     control the display,
     receive a touch operation with respect to the display surface, and,
     when an incoming call is received,
       display an incoming call screen including a first object on the display, and,
       when a touch operation to the first object is performed, answer the incoming call by,
         when the touch operation comprises a touch to the first object followed by movement into or toward a first region of the incoming call screen, providing sound from the call to a speaker of the mobile terminal device and,
         when the touch operation comprises a touch to the first object followed by movement into or toward a second region of the incoming call screen that is different than the first region, providing the sound from the call to an external speaker that is different than the speaker of the mobile terminal device.

2. The mobile terminal device according to claim 1, wherein the first object is disposed between the first region and the second region of the incoming call screen.

3. The mobile terminal device according to claim 2, wherein an entire periphery of the first object is surrounded by the first region and the second region.

4. The mobile terminal device according to claim 2, wherein the at least one processor sets a third region around the first object.

5. The mobile terminal device according to claim 2, wherein the at least one processor displays a second object different from the first object within a boundary of at least one of the first region and the second region on the incoming call screen, and wherein the at least one region excludes the second object.

6. The mobile terminal device according to claim 1, wherein the at least one processor:
   displays, in the first region, a first image for guiding a direction of the touch operation for setting the speaker of the mobile terminal device; and
   displays, in the second region, a second image for guiding a direction of the touch operation for setting the external speaker;
   changes a display manner of the second image while the touch operation comprises a movement toward the first region; and
   changes a display manner of the first image while the touch operation comprises a movement toward the second region.

7. The mobile terminal device according to claim 1, wherein the touch operation comprises a flick from a position of the first object toward one of the first region or the second region.

8. The mobile terminal device according to claim 1, wherein the touch operation comprises a slide from a position of the first object into one of the first region and the second region and a release within the one of the first region and the second region.

9. The mobile terminal device according to claim 1, wherein the external speaker comprises an earphone or headphone.

10. The mobile terminal device according to claim 1, wherein the external speaker comprises a wireless earphone or a wireless headphone.

11. A control method for a mobile terminal device comprising a display and configured to receive an incoming call and a touch operation with respect to the display, the method comprising, when an incoming call is received:
   displaying an incoming call screen including a first object on the display; and,
   when a touch operation to the first object is performed, answer the incoming call by,
     when the touch operation comprises a touch to the first object followed by movement into a first region of the incoming call screen, providing sound from the call to a speaker of the mobile terminal device, and,
     when the touch operation comprises a touch to the first object followed by movement into a second region of the incoming call screen that is different than the first region, providing the sound from the call to an external speaker that is different than the speaker of the mobile terminal device.

\* \* \* \* \*